Sept. 20, 1927.
C. B. LANGSTROTH ET AL
1,643,274
WELDROD FOR ARC WELDING
Filed May 23, 1923
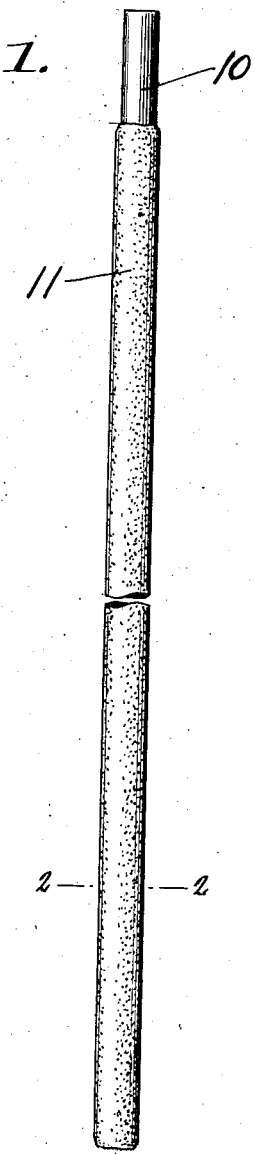
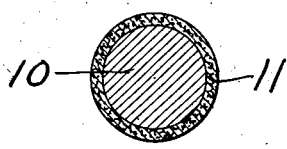
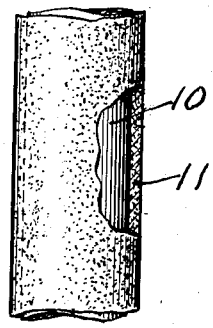
WITNESS
Fred Palm
DEL.
INVENTORS:
C. B. Langstroth
and G. G. Wunder,
By Erwin, Wheeler & Woolard
ATTORNEYS.

Patented Sept. 20, 1927.

1,643,274

UNITED STATES PATENT OFFICE.

CLIFFORD B. LANGSTROTH AND GEORGE G. WUNDER, OF MILWAUKEE, WISCONSIN, ASSIGNORS TO A. O. SMITH CORPORATION, OF MILWAUKEE, WISCONSIN, A CORPORATION OF NEW YORK.

WELD ROD FOR ARC WELDING.

Application filed May 23, 1923. Serial No. 640,838.

This invention relates generally to the type of metallic-arc weldrod in the form of a metallic wire provided with a chemically treated combustible coating or covering which may be so formulated and constituted as to create a non-oxidizing atmosphere about the arc during the fusion of the weldrod in the performance of the welding operation, and involves an improvement on the coated or covered weldrods disclosed in the patents to R. S. Smith, No. 1,301,331, April 22, 1919, and No. 1,347,184, July 20, 1920.

The patent first mentioned contemplates a weldrod formed as a wire and provided with a coating or covering of paper. The patent last mentioned contemplates a weldrod formed as a wire and provided with a covering or coating of compounded paper pulp and clay formed and impacted thereon, the coating or covering in its plastic state being applied to the wire as the latter is drawn through an orifice in a stuff chest from which the compound is exuded under pressure, so as to take the form of and cover the wire. In both constructions, silicate of soda is employed as a saturant. In both, it acts as a binder and retarder of combustion of the covering material.

The weldrods disclosed in the previous patents have been extensively used with success. But our present invention represents a development of continued experimentation, having for its purpose the production of a weldrod capable of more satisfactorily achieving the purposes and results of the patented structures, and yet susceptible of a very material reduction in its manufacturing cost. In such experimentation we have discovered that compounds having other formulæ than those disclosed in the patents referred to may be used as a coating or covering for the wire, and permit the attainment of a more highly perfected welding operation, in that some objectionable conditions attendant upon the use of the patented weldrods have been remedied. The formation of gases, the expansion of which exerted a destructive tendency upon the coating or covering, and the presence in the welded joint of refractory slags due to the employment of kaolin in the coating or covering, have been obviated in our new weldrod.

In carrying out the plans of our present invention, we employ as a base for the coating or covering of the wire a material in the form of mechanically produced wood flour or meal. This finely comminuted material is treated to remove its gas producing resinous constituent by digesting it in a strong alkaline solution for a suitable period of time, after which it is washed to free it from the alkali and then dried to remove the moisture. The wood fibre when thus conditioned is mixed with sodium silicate to produce a plastic mass, which may be exuded under pressure to form a tubular sleeve-like coating or covering about the wire as the latter is drawn through an orifice of the stuff chest containing the plastic compound. After drying to expel the moisture from the covering, the weldrods are ready for use.

The novel features of our invention will be pointed out in the appended claims.

In the drawing:

Figure 1 is a view in elevation showing a weldrod formed as a metallic wire provided with a coating or covering, in accordance with the purposes of our invention, the weldrod being broken out at the center.

Fig. 2 is a horizontal sectional view on the line 2—2, Fig. 1.

Fig. 3 is an enlarged view in elevation showing a short intermediate section of the weldrod, with the coating or covering broken away at one side.

Referring to the drawing, the numeral 10 indicates a length of wire, by means of which the electric current forming the "metallic arc" is conducted in the welding operation, and designed to form the core of our improved weldrod. By means of the arc thus formed, the wire is fused, and in order to maintain the arc as a constant during such welding, the wire is fed toward the work in the ratio of its fusion or consumption. It is desirable that the properties of the wire bear such relation to those of the work, that complete amalgamation of the molten metal flowing from the current conducting wire with the fused areas of the work will take place and a sound joint will be produced.

We apply to the wire 10 a compounded coating or covering 11, while the material forming the latter is in a plastic state, one of the purposes of such covering or coating being to create a slowly disintegrating sleeve-like envelope for the wire, so that a crater will be formed by the unconsumed portion thereof which surrounds the end of the wire at the time of its fusion, and from which the molten metal of the wire is projected upon and into the line of the weld. The material from which the coating or covering is formed is saturated with silicate of soda, the effect of the heat resisting qualities of which is to retard combustion of the fibrous material forming the base of the compound. We also create and surround the arc with a non-oxidizing atmosphere as conducive to the production of a perfect weld which is free from blemish.

In preparing the compound for covering or coating the wire, we use as a base, a material in the form of mechanically produced soft wood flour or meal, which is digested for a suitable period of time in sodium hydroxide to remove the lignins, resins, pentosans, hexosans, beta and gamma cellulose, which are some sources of the premature gasification, therefrom. The mixture is then washed to free it from the alkali and the above alkali soluble constituents, and afterwards heated to expel the moisture. By the addition of sodium silicate the lumpy mixture is formed into a plastic compound of such constituency as to flow freely under pressure but not voluntarily, so that it will cohere in any formation imparted to it.

The wire designed to form the core of an improved weldrod is passed through a stuff chest, emerging therefrom through a contracted orifice. The plastic mass is placed in the stuff chest, and upon the application of pressure is caused to flow through the orifice with the wire. The latter emerges from the orifice at a uniform rate of speed, and the exuded plastic material is formed and impacted about the wire by compression so as to completely coat or cover the same. The principal purpose of the coating or covering is to form a medium for carrying the heat resisting and non-oxidizing elements; and it need therefore be of a body sufficient only for the attainment of these effects. But the best results in welding are achieved by forming such coating or covering with a substantial body in order to produce the crater before described. The thickness of the coating or covering may therefore be determined by the particular conditions attending its use.

The coated or covered weldrods when dried are ready for use. But we may give them a final coat of sodium silicate, which latter may be applied either before or after the drying operation.

The coating or covering which we apply to the wire is free from constituents too readily gasified, the expansion of which during the welding operation has a tendency to disintegrate the coating prior to its disintegration under heat.

Having thus described our invention, what we claim and desire to secure by Letters Patent of the United States, is:

1. A weldrod constituted as a metallic wire provided with a coating or covering of wood flour previously digested to remove its gas producing properties.

2. A weldrod constituted as a metallic wire provided with a coating or covering of wood flour previously digested to remove its gas producing properties and saturated with a heat resisting compound.

3. A weldrod constituted as a metallic wire provided with a coating or covering of wood flour previously digested to remove its gas producing properties and saturated with silicate of soda.

4. A weldrod constituted as a metallic wire having formed and impacted thereon a coating or covering of finely comminuted wood flour, from which the gas producing properties have been removed, and having mixed therewith a heat resisting substance.

In testimony whereof, we have signed our names at Milwaukee, this 21st day of May, 1923.

CLIFFORD B. LANGSTROTH.
G. G. WUNDER.